Aug. 17, 1937.　　　　　I. HAWLEY　　　　　2,090,480

PANEL

Filed June 5, 1936

INVENTOR.
Irad Hawley
BY Cornelius Zabriskie
ATTORNEY.

Patented Aug. 17, 1937

2,090,480

UNITED STATES PATENT OFFICE 2,090,480

PANEL

Irad Hawley, Millburn, N. J.

Application June 5, 1936, Serial No. 83,604

19 Claims. (Cl. 189—46)

This invention relates to a panel or the like adapted to be used as a part of a door or as an element of building construction, as well as a panel or wall entering into closure construction, such as a filing cabinet or the like, in which foregoing environs the panel may be employed as a part or whole of a wall or partition.

The primary object of the invention is to obtain a panel which, under normal conditions, is relatively thin, but which, when subjected to such relatively high temperatures as occur in the event of fire, the panel will be acted upon by the resulting heat and, through inherent autogenous pressure resulting from such heat, will be increased to such thickness and will have such inherent structure as to bar the passage of the conflagration therethrough.

I have been able to achieve this object by enclosing between appropriate non-inflammable sheathings a suitable filler with which is commingled an appreciable quantity of unexpanded vermiculite.

Vermiculite is a non-metallic mineral and, more particularly, an aluminum-magnesium silicate, which, in its crude form, generally contains from approximately 7% to 9% of chemically combined moisture. When vermiculite is subjected to temperatures, such as frequently occur in the event of fire, this combined moisture is transformed into steam which, in an effort to liberate itself, forces an expansive explosion of the plate like crude material into honeycombed granules having a cell-like structure.

I utilize these inherent physical properties of vermiculite in carrying out the present invention and include, as stated, a quantity of crude, unexpanded vermiculite in comminuted form and in dispersed relation throughout the filler between the non-inflammable sheathing. This structure may be made in the form of a relatively thin panel to remain as such until conflagration takes place. When the temperature in the vicinity of the panel rises to a dangerous point, the crude vermiculite within the panel expands in the manner stated, causes the sheathing to be bulged apart and forms, between the sheathing, a honeycomb-like structure embodying isolated air pockets which collectively form an insulating medium of appreciable thickness and this, together with the filler, will materially retard the transfer of heat therethrough.

The filler employed may be of any appropriate character as hereinafter more fully described, but the finished structure should be of a dry nature and the filler must be such that when the vermiculite is interspersed therein between the sheathing, vibration will not cause the vermiculite material to settle to the bottom of the panel, but such vermiculite material should be maintained in proper dispersed condition over all parts of the panel to function in the manner described when subjected to high temperatures.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1:
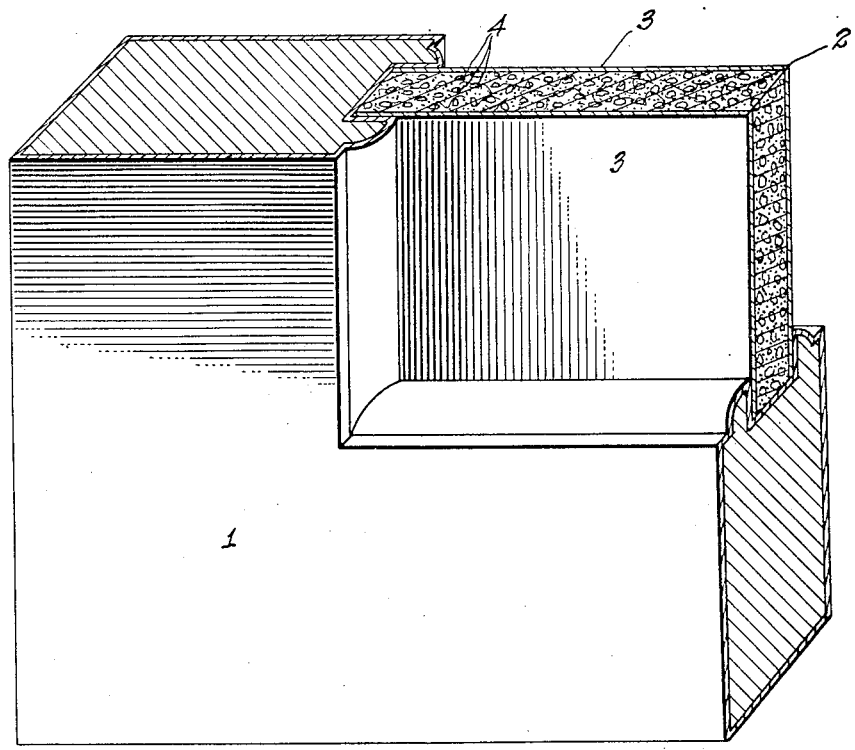
Figure 1 is a perspective section showing a section of a panel embodying this invention incorporated in the structure of a kalamein door and showing the panel in normal condition.

While the panel of this invention may be employed for various purposes and in various environs, I have chosen to show in Figure 1 of the drawing, the invention as incorporated in the panel for a kalamein door. Here the frame of the door is indicated generally by the reference character 1, while the panel is designated generally by the reference character 2.

According to Figure 1, the sheathing embodies two spaced apart sheet metal plates 3 with an interposed filling including crude vermiculite, broken up into relatively small pieces and distributed throughout an appropriate filler. The filler may vary within wide limits depending upon the particular use desired and I do not desire to restrict myself in this regard, as one or more materials may enter into its composition. However, for the purpose of concrete illustration, the following compositions may be mentioned, to wit:—plaster with a light aggregate and vermiculite; the same composition substituting gypsum for plaster; and the use of plaster or gypsum with vermiculite and without an aggregate. Portland cement with or without a light aggregate plus vermiculite may be used, and diatomaceous earth may be added if desired. Likewise, the filler may embody organic or inorganic fibre, plus vermiculite, with or without other fillers or binders and if binders are used, clay with a silicate of soda binder, and vermiculite has been found to give satisfactory results. Also fly ash or asbestos fibre, with vermiculite and an appropriate added binder, such as silicate of soda, may be employed and fire-proofed wood fibre may be used with the vermiculite with or without other materials. Very satisfactory results may be obtained with inorganic fibre, such as rock wool, mineral wool, glass wool and the like, combined with comminuted vermiculite and a binder and, in some cases, solidified plastic resins with dispersed vermiculite therein may be used. I may even use expanded vermiculite as a light aggregate or filler in the composition.

No attempt will be here made to give examples of all of the percentages of the compositions employed, but it may be stated that fire-proofed wood fibre, 60 per cent by weight, with vermiculite, 40 per cent by weight, has produced highly satisfactory results. Likewise the combination of three parts gypsum and one part vermiculite aso worked very well. A panel embodying asbestos fibre, 60 per cent by weight, vermiculite, 40 per cent by weight with 5 per cent silicate of soda, 40° Bé. as a binder, gave good results.

The manner of introducing the composition between the metal sheathing may vary depending upon conditions. For example, in some cases it is entirely practical to make an appropriate plastic mix and roll or flow the composition into sheet-like form onto one plate of the sheathing and thereafter superimpose the other plate or to form the composition in board-like form between sheets of cardboard or asbestos and thereafter place the metal sheathing on the opposite sides thereof. Such metal sheathing may be adhesively secured to the cardboard coverings if desired to allow ease of handling the structure as a unit. Furthermore, where mineral wool is provided as a filler, the wool may be mixed with vermiculite either with or without a binder and compressed into plate form and thereafter sheathed with non-inflammable sheathing.

In the drawing, the vermiculite is designated by the reference character 4, while the filler is designated generally by the reference character 5.

Figure 2:
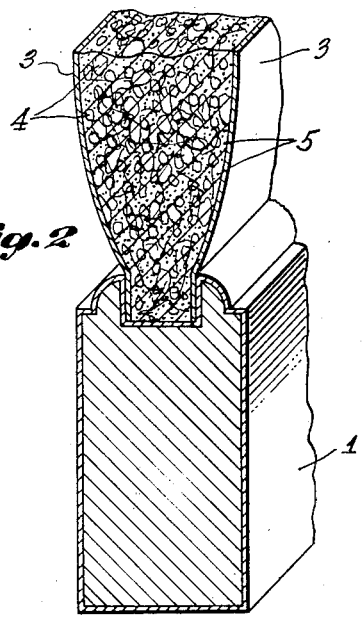
Figure 2 is a fragmental perspective section showing the panel expanded after subjection to fire.
Figure 3:
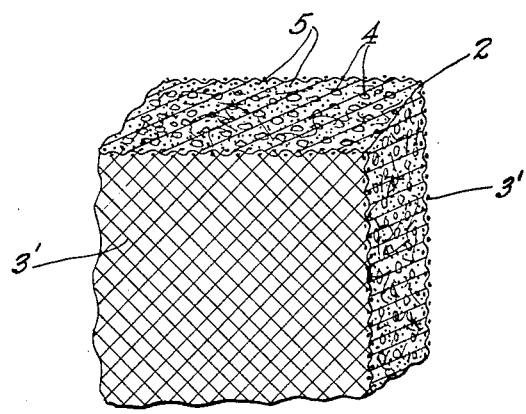
Figure 3 is a fragmental perspective view of a section of panel embodying a modified form of the invention.

In Figures 1 and 2, the sheathings 3 are shown in the form of sheet metal plates which, in practice, may be either flat or plane, and may occupy parallel or non-parallel planes. They may be embossed or otherwise ornamented and they may be solid, as shown, or perforated, reticulated or otherwise apertured, depending upon conditions. Furthermore, if desired, the sheathing may be foraminous or in the form of a mesh as shown at 3' in Figure 3. They may be plane or curved depending upon conditions.

Another way of carrying out the present invention is to provide the panel with an appropriate core, such, for example, as a sheet of corrugated asbestos paper and spread into the undulations of such core a composition embodying unexpanded vermiculite and an appropriate filler with or without a binder, as may be required under the conditions, and thereafter house the resulting structure within an appropriate sheathing or non-inflammable covering. The filler employed in this connection may be such that the resulting structure is sufficiently flexible to allow the same to bend and conform to such articles with which it may be desired to associate the same. Furthermore, instead of employing a core of corrugated asbestos, the core may be of a cellular, honeycomb or analogous structure, interstices of which are filled with the composition in question and the thus treated core may be used singly or in a plurality of plies or laminations depending upon conditions.

The percentage of the vermiculite employed in the composition may vary depending upon the protection desired. Generally speaking, the more vermiculite present, the greater will be the expansion and consequently the greater protection against the passage of heat. This will be apparent from a comparison of Figures 1 and 2 of the drawing. In Figure 1, the panel 2 is shown relatively thin and, in practice, it may be conveniently made from one-quarter to half an inch in thickness for kalamein doors. However, when such a panel is subjected to the heat of a fire, the vermiculite therein will expand and bulge out one or both of the opposite plates 3, as shown in Figure 2, thereby forming a cellular structure of high insulating character while the water present in the vermiculite is freed and further assists in keeping down the heat. As a higher degree of protection is desired, there should naturally be a greater percentage of vermiculite for a lesser percentage with corresponding filler will of course produce less expansion.

Tests made with various fillers have convinced me that, if the vermiculite runs between 25-50 per cent by weight of the composition, very satisfactory results are obtainable, although the percentage may be higher or lower depending upon conditions.

It will be noted from Figure 2 that the frame of the door is channeled to receive the panel of this invention and this channel constitutes means for securing the sheathings 3 to one another, so that they will not become detached when the panel expands under heat. Any other appropriate means may be employed to secure the sheathings together, particularly when the panel is used otherwise than as an element of a door.

A composition embodying this invention, assembled between metal sheathings and dried to solid form will give very satisfactory results as a gasket for, when subjected to heat, the vermiculite will undergo sufficient expansion to produce a gas and liquid tight joint.

Furthermore, the composition which I have described may be used as a boiler coating or pipe covering, such composition being applied in such condition that it may properly cover the structure with which it is to be associated and to be bound thereto with an appropriate non-inflammable sheathing, so that, when subjected to heat and the vermiculite expanded in place, a heat insulating covering will result.

I have hereinbefore described this invention as utilizing vermiculite in crude or unexpanded or unexfoliated form and having, e. g., the following typical analysis: silica, 41 per cent; iron oxide, 7; aluminum oxide, 18; magnesium oxide, 21; calcium oxide, 1; alkalis (sodium and potassium), 1; moisture, 11. I am, of course, aware that material of this general character is known in different sections by different names and in some instances there is slight variation in the chemical composition. However, the invention is not restricted as to nomenclature, but consists in the use of an aluminum-magnesium silicate of the general character described, used in the manner stated and capable of expansion in situ as hereinbefore described.

The foregoing detailed description sets forth the invention in preferred, practical forms, but the invention is to be understood as fully commensurate with the appended claims.

Having thus fully described the invention, what I claim as new and desire to secure by Letters Patent is:

1. A panel comprising unexpanded vermiculite embedded in dispersed condition in a dry filler between sheathing of non-inflammable material.

2. A panel comprising unexpanded vermiculite dispersed throughout a filler and housed between non-inflammable sheathing.

3. A panel comprising a composition of unexpanded vermiculite commingled with a filler and housed between metal sheathings.

4. A panel comprising comminuted, unexpanded vermiculite dispersed throughout a filler of non-inflammable material and housed between metal sheathings.

5. As a new article of manufacture, a composition comprising comminuted, unexpanded vermiculite, a filler and a binder, said composition being in slab form and housed between non-inflammable sheathings.

6. As a new article of manufacture, spaced apart metal sheathings and between said sheathings a dry composition comprising comminuted vermiculite dispersed throughout a filler.

7. As a new article of manufacture, a slab-like structure comprising unexpanded vermiculite dispersed throughout a filler and at least one face of which is covered by a non-inflammable sheathing.

8. As a new article of manufacture, a slab-like structure comprising unexpanded vermiculite dispersed throughout a filler and both faces of which are covered by non-inflammable sheathings.

9. A kalamein door provided therein with a panel having spaced apart metal plates and between said metal plates a composition of unexpanded vermiculite material dispersed throughout a filler.

10. A kalamein door provided therein with a panel having spaced apart metal plates and between said metal plates a composition of unexpanded vermiculite material dispersed throughout a filler, and a binder for normally maintaining the particles of vermiculite from shifting.

11. A kalamein door having therein a panel comprising sheet metal plates spaced apart and between said plates a filler of dry material throughout which is interspersed a quantity of unexpanded vermiculite.

12. A kalamein door having therein a panel comprising sheet metal plates spaced apart and between said plates a filler of dry material throughout which is interspersed a quantity of unexpanded vermiculite and a frame around the panel to secure said plates to one another.

13. As a new article of manufacture, two non-inflammable sheathings spaced apart and, in said space, a filler of dry material throughout which is interspersed unexpanded vermiculite.

14. As a new article of manufacture, two non-inflammable sheathings spaced apart and, in said space, a filler of dry material throughout which is interspersed unexpanded vermiculite, and means for securing said sheathings to one another.

15. As a new article of manufacture, a core having an undulating section, in the undulations of which is contained a composition comprising unexpanded vermiculite dispersed throughout a filler.

16. As a new article of manufacture, a core having an undulating section, in the undulations of which is contained a composition comprising unexpanded vermiculite dispersed throughout a filler and a binder.

17. As a new article of manufacture, a core provided with recesses containing unexpanded vermiculite dispersed throughout a filler.

18. As a new article of manufacture, a core provided with depressions substantially filled with a composition comprising unexpanded vermiculite dispersed throughout a filler.

19. As a new article of manufacture, a bendable core provided with recesses containing a dry, bendable composition comprising unexpanded vermiculite dispersed throughout a filler.

IRAD HAWLEY.